United States Patent [19]

Bailly et al.

[11] Patent Number: 5,063,110

[45] Date of Patent: Nov. 5, 1991

[54] COMPOSITION COMPRISING PREPOLYMER POWDER AND PULVERULENT INORGANIC MATERIAL

[75] Inventors: Jean-Claude A. Bailly, Martigues; Joelle Collomb, Marseille, both of France

[73] Assignee: BP Chemicals Limited, London, England

[21] Appl. No.: 547,683

[22] Filed: Jul. 2, 1990

Related U.S. Application Data

[62] Division of Ser. No. 197,828, May 12, 1988, Pat. No. 4,970,279.

[30] Foreign Application Priority Data

Oct. 2, 1986 [FR] France ............................. 86 13854
Oct. 2, 1987 [FR] France ............ PCT/GB87/00697

[51] Int. Cl.$^5$ .................... C08F 4/02; C08L 23/04
[52] U.S. Cl. .................................. 428/402; 524/493; 524/570; 524/586; 526/63; 526/908; 526/352; 502/104; 502/108
[58] Field of Search ............... 526/63, 904, 908, 909, 526/348.4, 348.6, 352; 428/402; 502/103, 104, 108; 524/493, 586, 570

[56] References Cited

U.S. PATENT DOCUMENTS

| | | | |
|---|---|---|---|
| 2,970,135 | 1/1961 | Lanning et al. | 526/904 X |
| 3,132,125 | 5/1964 | Schwander et al. | 526/908 X |
| 4,611,038 | 9/1986 | Brun et al. | 526/151 X |

FOREIGN PATENT DOCUMENTS

| | | | |
|---|---|---|---|
| 0180420 | 5/1986 | European Pat. Off. | 526/901 X |
| 2059217 | 5/1971 | France | 526/904 |
| 87/00697 | 10/1987 | PCT Int'l Appl. | |

Primary Examiner—Fred Teskin
Attorney, Agent, or Firm—Brooks Haidt Haffner & Delahunty

[57] ABSTRACT

A process for (co)polymerizing alpha-olefins in the gas phase in a fluidized bed or mechanically stirred bed reactor using a Ziegler-Natta type catalyst or a heat activated chromium oxide/refractory oxide catalyst wherein the (co)polymerization is carried out in the presence of 0.005 to 0.2 weight %, based on the weight of the (co)polymer bed, of an inert pulverulent inorganic substance (e.g. silica) having a mean particle diameter between 0.5 and 20 microns. The process is capable of being operated at temperatures closer to the softening point of the produced polyolefin than in the absence of the pulverulent solid.

2 Claims, No Drawings

COMPOSITION COMPRISING PREPOLYMER POWDER AND PULVERULENT INORGANIC MATERIAL

This is a division, of application Ser. No. 07/197,828, filed May 12, 1988, now U.S. Pat. No. 4,970,279.

The invention relates to a process for the polymerisation or copolymerisation of alpha-olefins and optionally dienes in the gaseous phase, in a fluidised and/or mechnically agitated reactor, in the presence of a Ziegler-Natta type catalytic system or a catalyst based on activated chromium oxide by a thermal treatment in a non-reducing atmosphere. Such catalytic system or catalyst can if desired be employed in the form of a prepolymer prepared therefrom.

It is known to polymerise alpha-olefins in the gaseous phase, for example, using a fluidised bed reactor in which solid particles of polymer in the course of formation are maintained in the fluidised condition by an ascending gas flow containing in particular the alpha-olefins to be polymerised. As it passes through the fluidised bed, a portion only of the alpha-olefins is polymerised in contact with the particles of polymer in course of formation. That fraction of the alpha-olefins which has not reacted leaves the fluidised bed and passes through a cooling device adapted to dissipate the heat evolved during polymerisation, before being recycled into the fluidised bed reactor. Polymerisation is generally performed continuously, i.e., by introducing into the fluidised bed reactor, continuously or semi-continuously, solid particles of catalyst from which the polymer particles will develop, the resulting polymer powder being withdrawn from the reactor, also continuously or semi-continuously.

The polymerisation of alpha-olefins in the gaseous phase is performed in the presence of a Ziegler-Natta type catalytic system formed by a combination of a solid catalyst based on at least one compound of a transition metal belonging to Groups IV, V or VI of the Periodic Table of Elements, and a co-catalyst comprising at least one organometallic compound of a metal of Groups I to III of this Table, or in the presence of a solid catalyst containing a chromium oxide compound activated by a thermal treatment in a non-reducing atmosphere.

It is also known that the catalytic system or catalyst can be previously converted into an alpha-olefin prepolymer obtained by bringing the catalytic system or catalyst into contact with one or more alpha-olefins, so as to form a catalytically active prepolymer which can be directly used in the polymerisation of alpha-olefins in the gaseous phase. This prepolymer is formed by solid particles whose size can be controlled as required and which have an activity in the polymerisation of alpha-olefins which is particularly well suited to a process in the gaseous phase.

Whatever the kind of catalyst used in a gas phase polymerisation process may be, the catalyst particles develop during polymerisation into polymer particles of larger dimensions. In a polymerisation process using a fluidised bed reactor, the velocity of the ascending gas flow is so selected that the largest polymer particles are kept in the fluidised condition and not deposited on the bottom of the reactor or the fluidisation grid, and the finest particles are not entrained out of the fluidised bed into zones in which the polymerisation reaction is undesirable. More particularly, it is important for the ascending gas flow to give the fluidised bed the best possible homogenisation so as to avoid the appearance of hot spots, which may soften or melt the polymer particles and therefore form agglomerates and finally lead to the stoppage of polymerisation.

It is moreover known that an increase in the polymerisation temperature generally enhances the yield of the poly-alpha-olefins in relation to the catalyst. This is why the polymerisation of alpha-olefins in the gaseous phase is generally performed at the highest possible temperature, although the temperature is substantially lower than that from which onwards the polymer particles begin to soften and agglomerate with one another by sintering. It is moreover known in general that a polyolefin powder has a lower softening temperature and therefore a stronger tendency to agglomerate by sintering at a given temperature, in proportion as the density, the weight average molecular weight or the degree of crystallinity of such polyolefin decrease. Thus, the production in the gaseous phase of certain polyolefins can be more difficult to perform and in conditions less advantageous than others. This is more particularly the case with linear low density polyethylenes or amorphous copolymers of ethylene and propylene which are produced in the gaseous phase at relatively lower temperatures than high density polyethylenes or crystalline polypropylenes.

It is also known that a Ziegler-type solid catalyst component can be introduced into a gas phase polymerisation reactor separately from an organoaluminium co-catalyst component by a method wherein the relatively viscous liquid organoaluminium compound is previously impregnated into a porous inert powder consisting of particles having a mean diameter in the range 10 to 1000 microns. The inert powder which can be organic or inorganic, for example a polyolefin or a silica, is in this case introduced into a bed of fluidised polymer particles in relatively large quantities. When the inert powder is different from the polyolefin being prepared, and particularly when it is an inorganic powder, the quality of the final product can be seriously impaired.

A new process has now been discovered for the polymerisation or copolymerisation of alpha-olefins in the gaseous phase which reduces the aforementioned difficulties, and more particularly provides a process able to produce in the gaseous phase polyolefins of very different types especially of low density, of low weight average molecular weight, or of an essentially amorphous or elastomeric nature. i.e., with low degree of crystallinity, in industrially advantageous conditions, more particularly at relatively high polymerisation temperatures which are closer to the softening point of the polyolefins produced and with high yields.

The invention provides a process for the polymerisation or copolymerisation of alpha-olefins and optionally dienes in the gaseous phase, in a fluidised and/or mechanically agitated reactor, in the presence of a Ziegler-Natta type catalytic system or a catalyst based on chromium oxide activated by a thermal treatment in a non-reducing atmosphere, the process being characterised in that the polymerisation or copolymerisation is performed in the presence of more than 0.005% and less than 0.2% by weight, with reference to the polymer or copolymer forming the bed, of a pulverulent inorganic substance consisting of particles chemically inert to the alpha-olefins, dienes or catalytic system or catalyst, and being free from transition metal compound, the said particles having a mean diameter by mass less than 20 microns but not less than 0.5 microns, this mean diameter by mass being 50 to 500 times smaller than the mean diameter by mass of the particles of polymer or copolymer forming the bed.

The invention further provides a process for the polymerisation or copolymerisation of alpha-olefins and optionally dienes in the gaseous phase, in a fluidised-bed and/or mechanically agitated reactor, in the presence of a chromium oxide based catalyst activated by thermal treatment in a non-reducing atmosphere, or of a Ziegler-Natta type catalytic system formed by a catalyst comprising at least one compound of a transition metal belonging to Groups IV, V or VI of the Periodic Table of Elements and a cocatalyst containing at least one organometallic compound of a metal belonging to Groups I to III of this Table, the process being characterised in that the catalyst or catalytic system is used in the polymerisation or copolymerisation medium in the gaseous phase in the form of a composition comprising:

(a) 100 parts by weight of a powder comprising a prepolymer of one or more alpha-olefins and possibly dienes, this powder containing $10^{-3}$ to $10^{-1}$ milligram atoms of chromium or of the transition metal of the catalyst per gramme, and containing between 0 and 20 millimoles of at least one organo-metallic compound of a metal belonging to Groups I to III of the Periodic Table of Elements per milligram atom of chromium or of the transition metal, and (b) from 0.1 to 20 parts by weight of a pulverulent inorganic substance consisting of particles chemically inert to the constituents used in the polymerisation or copolymerisation in the gaseous phase, and being free from transition metal compound, said particles having a mean diameter by mass less than 20 microns but not less than 0.5 microns, this mean diameter by mass being 10 to 200 times smaller than the mean diameter by mass of the prepolymer particles and 50 to 500 times lower than the mean diameter by mass of the prepolymer particles of polymer or copolymer forming the bed.

The pulverulent inorganic substance used according to the invention is formed by relatively fine solid particles whose mean diameter by mass is 50 to 500 times lower, preferably between 70 and 300 times lower than the mean diameter by mass of the polymer or copolymer particles forming the fluidised and/or mechanically agitated bed. This pulverulent inorganic substance allows an improvement in the conditions of producing polyolefins by a gas phase polymerisation or copolymerisation process. For example, the use of this pulverulent powder permits the use of higher maximum polymerisation or copolymerisation temperatures than can be used in the absence of this powder. This is because it is found that agglomeration of the polymer particles commences to occur at higher temperatures when the pulverulent powder is employed.

In the field of fine powders, which are used for conditioning particulate solids, it was already known to add thereto about 0.2 to 5%, preferably 1 to 2% by weight of a pulverulent inorganic substance, such as a micronised silica, with the view to preventing the particulate solids from becoming lumpy and facilitating the operations of grinding, mixing, conveying, removal from silos and bagging. It is known that in these conditions such a pulverulent inorganic substance may act as a dry lubricating agent to the particulate solids more especially by becoming distributed over the surface of the individual particles of the solids. However, such a pulverulent inorganic substance has not hitherto been used during an alpha-olefin polymerisation reaction, since it might have been expected that such pulverulent inorganic substance, distributed over the surface of the polymer particles in course of growth, would become gradually embedded in the polymer, as the polymerisation reaction developed and the particles increased in size. Under these conditions the particles of the pulverulent inorganic substance would cease to have the desired conditioning effect. However, it has been found that this pulverulent inorganic substance very substantially improves the conditions of production of polyolefins in the gaseous phase, in a manner all the more surprising since it is used in the polymerisation medium in a quantity appreciably smaller than that generally recommended in the field of powder conditioning. It has also been surprisingly found that, having regard to the fineness of the pulverulent inorganic substance used in the polymerisation medium and the relatively high speed of the ascending gas flow passing through the fluidised bed, the pulverulent inorganic substance is not severely entrained out of the fluidised bed and the polymerisation medium.

The mean diameter by mass of the particles of the pulverulent inorganic substance used according to the invention can in practice be less than 20 microns but not less than 0.5 microns and are preferably between 1 and 10 microns, and more particularly still between 1 and 20 microns. It has been observed that particles having the aforementioned dimensions enable the required result to be obtained efficiently, while particles of larger dimensions are less efficient and particles of smaller dimensions are liable to be entrained out of the polymerisation medium.

The pulverulent inorganic substance advantageously has a porosity measured with a mercury porosimeter in a range of pore radii between about 5 and 8000 nm, corresponding to a volume of pores of between 0.2 and 2.5 ml/g, preferably between 0.4 and 2.0 ml/g. It moreover has a specific surface area (BET) of between 20 and 900 m$^2$/g, preferably between 100 and 800 m$^2$/g.

The pulverulent inorganic substance must be substantially chemically inert to the alpha-olefins, dienes and catalytic system or catalyst used, and free from any transition metal compound, especially transition metal compounds capable of acting as polymerisation catalysts in the polymerisation process of the present invention. If necessary, it can be subjected to any preliminary operation allowing the elimination of impurities which might react with the various constituents used in the polymerisation medium in the gaseous phase. For example, such preliminary operation can comprise eliminating water which could otherwise react, with the catalytic system or catalyst. Such water can for example be eliminated by a thermal or chemical treatment, or by bringing the pulverulent inorganic substance into contact with an organometallic compound used in a sufficient quantity to react stoichiometrically with the water.

The pulverulent inorganic substance can be selected from a large variety of products, more particularly from mineral oxides, such as silica, alumina, magnesia, titania, zirconia, thoria, zinc or calcium oxides, or from the alkali or alkaline earth metal silicates or aluminates, such as the silicoaluminates of sodium; or from the metal oxysulphates, such as magnesium oxysulphate; or from talc, mica, asbestos, glass or carbon black. Suitable substances can advantageously be selected from inorganic substances used during the conversion of the polymer or copolymer powders into pellets or finished articles, or particularly the substances used as fillers or additives, such as nucleating agents. It is preferred to use silica, alumina, the alkali or alkaline earth silicates or aluminates. Silica is particularly preferred.

The pulverulent inorganic substance used according to the invention must be present in the polymerisation medium in a relatively small quantity, more particularly a quantity less than 0.2% by weight and greater than 0.005% by weight, preferably less than 0.1% and greater than 0.01% by weight based on the total weight of the polymer or copolymer forming the fluidised and/or mechanically agitated bed. Too small a quantity of the pulverulent inorganic substance does not allow an adequate improvement of the polymerisation or copolymerisation process in the gaseous phase and may lead to the formation of agglomerates in the bed. On the other hand, too large a quantity of the pulverulent inorganic substance, more particularly a quantity corresponding to that usually recommended in the field of conditioning powders, produces no further improvement in the polymerisation or copolymerisation process in the gaseous phase and deleteriously affect the quality of the polymer or copolymer produced.

The pulverulent inorganic substance is used in the polymerisation or copolymerisation medium in the gaseous phase by continuous or semi-continuous introduction. More particularly, it can be introduced into the fluidised and/or mechnically agitated bed separately from and independently of the catalytic system or catalyst, more particularly using a feed device separate from that of the catalytic system or catalyst. It can be introduced into the bed simultaneously with the solid catalyst. In that case the pulverulent inorganic substance can advantageously be used in the form of a mixture with the solid catalyst, whose particles remain separate from those of the pulverulent inorganic substance.

The pulverulent inorganic substance can, moreover, be used as such, more particularly in the form of a dry powder, or in the form of a mixture with a liquid, for example, a saturated hydrocarbon or an alpha-olefin which is liquid and readily volatile. It can be introduced either directly into the fluidised and/or mechanically agitated bed, or at the base of such a bed, more particularly through the bottom of the reactor or under the fluidisation grid, using, for example, a gas flow. Polymerisation or copolymerisation in the gaseous phase can be performed in the presence of a Ziegler-Natta type catalytic system formed by the combination on the one hand of a solid catalyst, comprising at least one compound of a transition metal belonging to Groups IV, V or VI of the Periodic Table of Elements, and on the other hand a co-catalyst comprising at least one organometallic compound of metal of Groups I to III of such Table, the co-catalyst being possibly liquid or gaseous in the polymerisation conditions. The compounds most frequently used are on the one hand halogenated derivatives of titanium, possibly associated with a magnesium compound, such as magnesium chloride, and/or a granular support, such as silica or alumina, and on the other hand alkyl aluminium compounds. The solid catalyst can preferably be used in the form of a prepolymer.

The alpha-olefins used in the preparation of the prepolymer contain 2 to 12 carbon atoms, preferably 2 to 8 carbon atoms, and are selected more particularly from ethylene, propylene, 1-butene, 1-hexene, 4-methyl-1-pentene or 1-octene. The dienes optionally used in the preparation of the prepolymer comprise double non-conjugate bonds and are preferably selected from 1-4-hexadiene, dicyclopentadiene or 5-ethylidene-2-norbornene.

The prepolymer powder is obtained during a prepolymerisation operation consisting in bringing the or each alpha-olefin and optionally the dienes into contact with a catalyst on a chromium oxide base or a Ziegler-Natta type catalytic system.

The catalyst based on chromium oxide which can be used in prepolymerisation is associated with a granular support on a refractory oxide base, such as silica or alumina. It is moreover activated by a thermal treatment in a non-reducing atmosphere, preferably an oxidising atmosphere, at a temperature of at least 250° C. and at most equal to the temperature at which the granular support begins to sinter. The catalyst comprises chromium oxide compounds at least partially in the hexavalent state and optionally compounds of titanium, fluorine or organometallic compounds. During or at the end of prepolymerisation use can be made of at least one organometallic compound of a metal belonging to Groups I to III of the Periodic Table of Elements, a metal such as aluminium, zinc or magnesium. It is preferred to use trialkyl aluminiums, alkylaluminium chlorides or alcoholates, dialkyl zincs or dialkyl magnesiums.

The Ziegler-Natta type catalytic system which can be used for prepolymerisation is formed by a combination on the one hand of a solid catalyst comprising at least one compound of a transition metal belonging to Groups IV, V or VI of the Periodic Table of Elements, and on the other hand of a cocatalyst comprising at least one organometallic compound of a metal of Groups I to III of this Table, the cocatalyst possibly being liquid or gaseous in the polymerisation conditions. The catalyst compounds most frequently used are the halogenated derivatives of titanium, optionally associated with magnesium compounds, such as magnesium chloride, and/or granular supports, such as silica or alumina. The most frequently used cocatalyst compounds are alkyl aluminiums or alkyl zincs. In the particular case of producing a prepolymer of alpha-olefins containing at least three carbon atoms, such as propylene, the cocatalyst used can be an organoaluminium compound complexed by an electron donor compound of the aromatic acid ester type.

Prepolymerisation can be performed in the presence of hydrogen, used more particularly as a chain limiting agent to control the molecular weight of the prepolymers.

Prepolymerisation can be performed in suspension in a liquid diluent, such as aliphatic hydrocarbons or liquid alpha-olefins. It can also be performed in the gaseous phase, preferably in the presence of a solid pulverulent diluent used by way of charge powder, and advantageously formed by a polyolefin powder which can be of the same nature as that produced during prepolymerisation, or preferably during the polymerisation or copolymerisation in the gaseous phase. The pulverulent solid diluent is advantageously a substantially inert substance, or one which is made substantially chemically inert to the alpha-olefins, dienes and catalytic system or catalyst used. The pulverulent solid diluent agent is used in the prepolymerisation medium in a quantity generally lying between 25 and 500 parts by weight per 100 parts by weight of prepolymer to be produced.

Prepolymerisation can advantageously be performed in two stages. The first prepolymerisation stage, also called the catalyst coating stage, is performed at a relatively slow reaction speed by the polymerisation or copolymerisation of one or more alpha-olefins and possibly dienes, in suspension in a liquid medium until the coated catalyst contains preferably $10^{-1}$ to 10 milligram atoms of transition metal or chromium per gram of coated catalyst. While respecting the shape of the solid catalyst, the effect of this stage is to lead to a coated catalyst having properties which are favourable in the subsequent stages of the prepolymerisation and polymerisation or copolymerisation in the gaseous phase, as regards more particularly mechanical strength, abrasive strength, and apparent density and catalytic activity of the catalyst. The second prepolymerisation stage is performed either in suspension in a liquid medium, or in the gaseous phase, until the prepolymer takes the form of solid particles having a suitable size for polymerisation or copolymerisation in the gaseous phase.

Prepolymer prepared in one or two stages is isolated in the form of a powder formed by particles whose mean diameter by mass is preferably between 50 and 500 microns, and more particularly still between 80 and 300 microns. It also contains per gramme $10^{-3}$ to $10^{-1}$, preferably $5 \times 10^{-3}$ to $5 \times 10^{-2}$ milligramme atoms of transition metal or chromium. It also contains from 0 to 20, preferably 0.5 to 10 millimoles, of an organicmetallic compound of a metal belonging to Groups I to III of the Periodic Table of Elements per milligramme atom of the transition metal or chromium.

The prepolymer can be subjected to extraction operations using a suitable solvent, generally selected from the aliphatic hydrocarbons. In practice it is convenient to use as the extraction agent a hydrocarbon or a mixture of hydrocarbons of the same nature as that or those used as a liquid dispersing agent during prepolymerisation, when the latter is performed in a liquid medium. Extraction is preferably performed at a temperature of between 20° and 120° C. by lixiviation or simply by suspending the prepolymer in the solvent, then decanting the prepolymer and withdrawing the used solvent. It is preferable to perform several successive extractions, the prepolymer being left in contact with the solvent for a few minutes in each case. When extraction is completed, the prepolymer can be resuspended in a small quantity of solvent in which at least one organometallic compound of a metal belonging to Groups I to III of the Periodic Table of Elements is dissolved. The solvent can then be eliminated in an an inert atmosphere, for example, by evaporation under nitrogen, so as to isolate the prepolymer in the form of a powder catalytically active to alpha-olefins and dienes.

The pulverulent inorganic substance contained in the composition according to the invention is formed by particles having a mean diameter by mass 10 to 200 times smaller, preferably 20 to 100 times smaller than the mean diameter by mass of the prepolymer particles. The mean diameter by mass of the particles of the pulverulent inorganic substance is generally in the range 0.5 to 20 microns, preferably between 1 and 10 microns. It has been observed that particles whose dimensions are those mentioned above enable the required result to be obtained efficiently, while larger particles have substantially less efficiency and smaller particles are liable to be entrained out of the polymerisation medium.

When the catalyst or the solid component of the catalyst system is employed as a prepolymer, the pulverulent inorganic substance can be mixed with the prepolymer powder under an atmosphere of inert gas, such as nitrogen, so as to preserve the catalytic activity of the prepolymer. However, it is preferable first to mix the pulverulent inorganic substance with the prepolymer in the presence of a liquid hydrocarbon diluent such as an aliphatic hydrocarbon, chemically inert to the prepolymer and incapable of solubilising the catalyst contained in the prepolymer, then eliminating the liquid diluent from the mixture, for example, by evaporation in an inert atmosphere. Such a method has the advantage of giving a prepolymer-based mixture which is particularly homogeneous and efficient for the required improvement in the production of polyolefins.

The said mixture can also be prepared during the production of the prepolymer, more particularly by bringing into contact, at the start of or during prepolymerisation, the pulverulent inorganic substance, the catalyst or catalytic system, and one or more alpha-olefins and optionally dienes. Such contacting takes place in the prepolymerisation medium—i.e. either in the presence of a liquid diluent such as aliphatic hydrocarbons or liquid alpha-olefins, or in the gaseous phase, in the presence of a solid pulverulent diluent preferably based on a polyolefin and used as the charge powder. The composition according to the invention is obtained on completion of the prepolymerisation reaction, after having eliminated if necessary the liquid diluent used during prepolymerisation. However, it is not necessary to eliminate the liquid diluent and in that case the composition according to the invention, containing such liquid diluting agent, can be used directly in the polymerisation medium in the gaseous phase.

The said mixture can contain in addition to the prepolymer and the pulverulent inorganic substance a solid pulverulent diluent preferably based on a polyolefin, which is being used as charge powder during prepolymerisation in the gaseous phase. In that case the composition according to the invention can comprise (a) 100 parts by weight of the prepolymer powder, (b) from 0.1 to 20 parts by weight of the pulverulent inorganic substance and (c) from 25 to 500 parts by weight of a solid pulverulent diluent based on a polyolefin, which is substantially chemically inert to the constituents used in the polymerisation or copolymerisation, such solid pulverulent diluent being formed by particles having a mean diameter by mass generally of between 200 and 2000 microns.

The said mixture can be used in polymerisation or copolymerisation in the gaseous phase directly by introduction into the fluidised bed and/or mechanically agitated reactor. The polymerisation or copolymerisation in the gaseous phase of the or each alpha-olefin and possibly optionally being preferably performed continuously, the composition is advantageously continuously or semi-continuously introduced into the reactor, for example, by means of a gas flow which can contain an inert gas, such as nitrogen or hydrogen.

It has moreover been found that the supply to the polymerisation reactor of the catalyst or catalytic system used in the form of the said mixture of prepolymer and pulverulent solid is facilitated by the presence of the pulverulent inorganic substance, which appreciably improves the flowability of the prepolymer powder. Use can therefore be made in the composition according to the invention of alpha-olefin prepolymers and possibly dienes which have a particularly marked amorphous nature, without nevertheless causing handling difficulties. An advantage of this kind is more particularly required when the quality of the polyolefins to be produced in the gaseous phase demands a product free from crystallinity and therefore the use of an essentially amorphous prepolymer.

Independently and separately from the composition according to the invention, it is possible to introduce into the fluidised bed and/or mechanically agitated reactor an organometallic compound of a metal belonging to Groups I to III of the Periodic Table of Elements which is identical to or different from that present in the prepolymer powder. The organometallic compound can be used in the pure state or preferably in solution in a relatively volatile hydrocarbon.

The polymerisation or copolymerisation in the fluidised bed is advantageously started up in the presence of a solid pulverulent diluent which is substantially inert to the constituents of the polymerisation medium and is used by way of charge powder and formed by a poly alpha-olefin, preferably identical to that which is to be produced and therefore containing a pulverulent inorganic substance, such as that used in the production of the prepolymer.

Polymerisation or copolymerisation in the gaseous phase can also be performed in the presence of a solid catalyst containing a chromium oxide compound, associated with a granular refractory oxide support such as silica or alumina, and activated by a thermal treatment in a non-reducing atmosphere, preferably in an oxidising atmosphere, at a temperature of at least 250° C. and at most equal to the temperature at which the granular support begins to sinter. The chromium oxide compounds most used are chromium compounds at least partially in the hexavalent state, optionally containing compounds of titanium, fluorine or organometallic compounds. The solid catalyst can also in this case be used in the form of a prepolymer.

The gas phase used in the polymerisation medium contains the alpha-olefins and optionally dienes to be polymerised or copolymerised, more particularly alpha-olefins containing 2 to 12 carbon atoms, especially 2 to 8 carbon atoms, preferably ethylene, propylene, 1-butene, 1-hexene, 4-methyl-1-pentene or 1-octene, and optionally dienes with double nonconjugate bonds, such as 1-4-hexadiene or 5-ethylidene-2-norbornene. The gas phase can contain hydrogen to control the weight average molecular weight of the polyolefins produced. The gas phase can also contain an inert gas, such as nitrogen or a saturated, gaseous or liquid, but readily volatile hydrocarbon, for example, methane, ethane, propane, butane or pentane, more particularly so as to improve the dissipation of the polymerisation heat. The velocity of the ascending gas flow in a fluidised bed reactor is preferably high enough to ensure the homogenisation of the fluidised bed and to effectively dissipate the polymerisation heat. The fluidisation velocity is preferably 2 to 8 times the minimum fluidisation velocity—i.e., it is generally between about 20 and 80 cm/second. If necessary, other homogenisation means can be used, more particularly a mechanical agitation system.

Polymerisation or copolymeristion in the gaseous phase is performed at a temperature which can vary over a wide range, lying between $-30°$ C. and $110°$ C., more particularly between $-10°$ C. and $100°$ C., and preferably at a temperature relatively close to but lower than the softening temperature of the produced polyolefin.

Polymerisation or copolymerisation in the gaseous phase is preferably performed at a total pressure in the range 0.1 and 5 MPa.

By the process according to the invention it is possible to produce in the gaseous phase, under advantageous industrial conditions, a large variety of polymers or copolymers of alpha-olefins and optionally dienes, directly in the form of particles having a mean diameter by mass of between 200 and 2000 microns.

Thus, for example, it is possible to produce polyethylenes of high density, between 0.940 and 0.970, and of relatively low weight average molecular weight—i.e., with a melt index ($MI_{2.16/190}$), measured under a load of 2.16 kg at 190° C., higher than 20 g/10 minutes, and possibly reaching, for example, 250 g/10 minutes. Linear low density polyethylenes can also be produced, having a density between 0.940 and 0.910 and of relatively low weight average molecular weight—i.e., of melt index in ($MI_{2.16/190}$) higher than 5 g/10 minutes and possibly reaching, for example, 50 g/10 minutes. Very low density linear polyethylenes can also be produced, having a density lower than 0.910 and possibly as low as about 0.860. By the process according to the invention it is also possible to produce amorphous copolymers of ethylene, propylene and/or 1-butene, optionally with one or more alpha-olefins containing 5 to 12 carbon atoms, having a molar content of units derived from ethylene of between 40 and 60%, a density of between about 0.850 and 0.870 and a degree of crystallinity lower than or equal to 1.0%. Elastomeric copolymers of ethylene and propylene, and optionally dienes, can be prepared having a content by weight of units derived from ethylene of between 30 and 70%. The process can also be used to produce copolymers of propylene and at least one alpha-olefin selected from ethylene or alpha-olefins containing 4 to 12 carbon atoms, having a content by weight of said alpha olefin of between 2 and 40%, and a degree of crystallinity lower than 35%.

The pulverulent inorganic substance can be used in the course of the polymerisation or copolymerisation of the alpha-olefins in the gaseous phase, so that it is constantly present during the production of the polyolefins. It can also be used occasionally during a polymerisation or copolymerisation when agglomerates have appeared in the bed and their accidental formation is to be reduced or suppressed.

MEASUREMENT OF THE MEAN DIAMETER BY MASS (Dm) OF THE PARTICLES

The mean diameter by mass (Dm) of the particles of the pulverulent inorganic substance and of the polymers or copolymers is measured using an OPTOMAX image analyser (Micro-Measurements Ltd—Great Britain). The principle of the measurement consists in obtaining, from an experimental study by optical microscopy of a population of particles, a table of items which gives the number ($n_i$) of particles belonging to each class (i) of diameters, each class (i) being characterised by an intermediate diameter ($d_i$) lying between the limits of such class. According to approved French standard NF X 11-630 of June 1981, Dm can be calculated from the following formula:

$$Dm = \frac{\Sigma n_i(d_i)^3 d_i}{\Sigma n_i(d_i)^3}$$

Measurement using the OPTOMAX image analyser is performed by means of an inverted microscope which enables suspensions of particles to be examined with a magnification of between 16 and 200. A television camera takes the images given by the inverted microscope and transmits them to a computer which analyses the images received line by line and point by point on each line, in order to determine the dimensions or diameters of the particles, then to classify them.

DENSITY MEASUREMENT

This measurement is performed to Standard ASTM-D-1505.

MEASUREMENT OF MELT INDEX

The melt index, $MI_{2.16/190}$, is measured under a load of 2.16 kg at 190° C. by the method of ASTM-D-1238 condition E.

The melt index, $MI_{5/190}$, is measured under a load of 5 kg at 190° C. to the method of ASTM-D-1238 condition P.

DIFFERENTIAL SCANNING CALORIMETRIC ANALYSIS (DSC)

Differential scanning calorimetric analysis consists in recording the enthalpy graph of a sample of 5 mg of a polymer or copolymer by heating at a speed of 16° C. per minute up to 200° C., the sample having been first subjected to a thermal treatment formed by heating at a speed of 16° C. per minute to 200° C., followed by holding of this temperature for 20 minutes and cooling at a speed of 16° C. per minute down to 50° C.; the surface of the endothermal peak recorded during heating is proportional to the melting enthalpy; differential scanning calorimetric analysis enables the melting enthalpy of a polymer or copolymer to be measured corresponding to the quantity required to melt 1 gramme of such polymer or copolymer.

EXAMPLE 1

Preparation of a Catalyst 3 liters n-hexane and 300 g silica ("SD490", Joseph Crosfield and Sons Ltd, Great Britain) and dried at 500° C. in dry air for 5 hours were introduced under nitrogen at ambient temperature (20° C.) into a stainless steel 5 liter reactor having a stirring system and a heating and cooling device. To the mixture kept stirred at ambient temperature were added, slowly over 1 hour, 948 millimoles of n-butyl, sec-butyl magnesium. Then, the mixture was kept stirred in these conditions for 1 hour. The solid thus obtained was washed 4 times with the help of 2 liters of n-hexane at 20° C. and with intermediate decantation. The solid was then slurried in 2 liters of n-hexane and was heated to 50° C. and stirred. Then to the mixture were added, slowly over 1 hour, 876 millimoles of t-butyl chloride. The mixture was then kept stirred in these conditions for 1 hour. The solid thus obtained was washed 4 times with the help of 2 liters of n-hexane previously heated to 50° C. and with intermediate decantation. The solid was then slurried and stirred in a liter of n-hexane heated to 50° C. Then, to the mixture were added, slowly over 1 hour, 211 millimole of titanium tetrachloride. The mixture was then kept stirred in these conditions for 1 hour. The solid thus obtained was washed 4 times with the help of 2 liters of n-hexane previously heated to 50° C. and with intermediate decantation. The solid was then slurried and stirred in 2 liters of n-hexane heated to 50° C. To the mixture were added 8.4 millimoles of dimethylformamide (DMF). The mixture was kept stirred in these conditions for 1 hour and then cooled to ambient temperature (20° C.). The solid catalyst thus obtained was dried under partial vacuum at 60° C. The solid catalyst was a dry powder consisting of particles having a mean diameter by mass of 95 microns and containing 2% by weight of titanium.

Copolymerisation of Ethylene with 4-Methyl-1-pentene 200 g of a powder of ethylene and 4-methyl-1-pentene copolymer, identical with that to be produced, were introduced under nitrogen into a stainless steel fluidised and mechanically stirred bed reactor of 2.5 liter volume. The powder was subjected to nitrogen sweeping at 93° C. until a water content of 3 vpm was obtained in the reactor atmosphere. A gaseous mixture formed by hydrogen, ethylene and 4-methyl-1-pentene was introduced into the reactor and heated to 93° C. The partial pressures (pp) of the constituents of the gaseous mixture were as follows:
pp hydrogen: 0.45 MPa
pp ethylene: 0.45 MPa
pp 4-methyl-1-pentene: 0.05 MPa.

Then, 1.2 millimoles of tri-n-octylaluminium (TnOA) in a molar solution in n-hexane was introduced into the reactor, which was maintained in these conditions for 15 minutes. 0.36 g of the catalyst previously prepared and 0.1 g of a silica formed by particles having a mean diameter by mass of 2 microns, a pore volume 1.6 ml/g and a specific surface (BET) of 400 m²/g were introduced into the reactor, the silica being "SYLOBLOC 44" (W. R. GRACE—United States).

During the copolymerisation, the weight of the bed was kept relatively constant and equal to about 450 g in the reactor by sequenced withdrawals of the copolymer. After 3 hours of copolymerisation, the copolymer powder produced was collected, containing no agglomerates and having the following characteristics:
density: 0.95
melt index, measured under a load of 2.16 kg at 190° C.: 38 g/10 minutes
content by weight of titanium: 7 ppm
content by weight of silica: 0.01%
bulk density: 0.35 g/cm³
mean diameter by mass of the copolymer particles: 550 microns.

EXAMPLE 2

Preparation of a Catalyst 40 liters n-hexane, 50 g iodine and 700 g of a powder of metallic magnesium, formed by particles having a mean diameter by mass, Dm of 60 microns were introduced successively under nitrogen at ambient temperature (20° C.) into a stainless steel 60 liter reactor having a stirring system and a heating and cooling device. The mixture was kept stirred in these conditions for 3 hours. The reactor was heated to 80° C., and then 3.36 moles of titanium tetra-n-propylate and 3.36 moles of titanium tetrachloride were introduced successively and then, slowly over 4 hours, 40.6 moles of n-butyl chloride. At the end of that time the mixture was kept agitated for 3 hours and then cooled to ambient temperature (20° C.). The solid catalyst (A) thus obtained was washed 3 times, with intermediate decantation, with 20 liters of n-hexane. It contained 8% by weight of titanium.

Preparation of a Prepolymer 500 liters of n-hexane heated to 75° C., then 2.25 liters of a molar solution of tri-n-octyl aluminium (TnOA) in n-hexane and a quantity of previously prepared catalyst (A), containing 1.5 gram-atoms of titanium were introduced under nitrogen into a stainless steel 1,000 liter reactor having an agitating system and a heating and cooling device. Then a quantity of hydrogen corresponding to a partial pressure of 0.1 MPa was introduced into the reactor, followed by ethylene at a flow rate of 15 kg/h for 4 hours. The reactor was then degassed and cooled to ambient temperature 20° C. In this way a prepolymer (B) was obtained which was dried under nitrogen and contained 0.025 milligram atoms of titanium per gram.

Copolymerisation of Ethylene and n-Butene in a Fluidised Bed 70 kg of a powder of ethylene and 1-butene copolymer, identical with that to be produced, and coming from a preceding reaction were introduced under nitrogen into a stainless steel fluidised-bed reactor 45 cm in diameter having a fluidisation grid at its base. The powder was subjected to nitrogen sweeping at 65° C. until a water content of 3 vpm was obtained in the reactor atmosphere. A gaseous mixture formed by hydrogen, ethylene, 1-butene and nitrogen, driven at an ascending velocity of 50 cm/second at a temperature of 65° C. was then introduced into the reactor. The partial pressures (pp) of the constituents of the gaseous mixture were as follows:
pp hydrogen=0.08 MPa
pp ethylene=0.52 MPa
pp butene-1=0.38 MPa
pp nitrogen=0.62 MPa.

Then 0.7 liter of a molar solution of triethyl aluminium (TEA) in n-hexane was introduced into the reator, which was maintained in these conditions for 1 hour. 17 g of the prepolymer (B) and 0.67 g of a silica formed by particles having a mean diameter by mass, Dm, of 5 microns, a pore volume of 1.2 ml/g and a specific surface (BET) of 400 m$^2$/g was next introduced into the reactor in a sequenced manner at the rate of 1 injection every 5 minutes, such silica being marketed under the trade name "SYLOBLOC 47" (Reg.) by W. R. Grace (United States).

After about 3 hours, following the introduction of the prepolymer (B) and the silica, 10 ml/h of the molar solution of TEA in n-hexane was introduced into the reactor.

It was found that after stabilisation of the copolymerisation conditions, about 20 kg/h of an ethylene copolymer powder was collected by a sequenced withdrawal, which had a relatively low density, contained no agglomerates and had the following characteristics:
density: 0.870
content by weight of units derived from 1-butene: 21.3%
melt index in MI$_{2.16/190}$: 1.5 g/10 minutes
content by weight of titanium: 12 ppm
content by weight of silica: 0.04%
bulk density: 0.27 g/cm$^3$
mean diameter by mass of the copolymer particles: 700 microns
molecular weight distribution, Mw/Mn: 4.7.

EXAMPLE 3

Comparative

Copolymerisation of Ethylene and 1-Butene in a Fluidised Bed

Operations were performed exactly as in example 2, except that no silica was introduced into the reactor. The copolymerisation reaction was stopped prematurely because of the presence of copolymer agglomerates in the fluidised bed.

The recovered copolymer powder moreover flowed out of the reactor with difficulty and had a relatively low bulk densityequal to 0.20 g/cm$^3$.

EXAMPLE 4

Copolymerisation of Ethylene and 1-Butene in a Fluidised Bed 480 kg of an ethylene and 1-butene copolymer powder identical with that to be produced and originating from a preceding reaction was introduced under nitrogen into a stainless steel fluidised-bed reactor 90 cm in a diameter, having a fluidisation grid at its base. The powder was subjected to nitrogen sweeping at 92° C. until a water content of 3 vpm was obtained in the reactor atmosphere. A gaseous mixture formed by hydrogen, ethylene, 1-butene and nitrogen, driven at an ascending velocity of 50 cm/second at a temperature of 92° C. was then introduced into the reactor. The partial pressures (pp) of the constituents of the gaseous mixture were as follows:
pp hydrogen=0.36 MPa
pp ethylene=0.40 MPa
pp 1-butene=0.01 MPa
pp nitrogen=0.80 MPa.

Then 0.4 liter of a molar solution of TEA in n-hexane was introduced into the reactor, which was maintained under these conditions for 1 hour. 56.6 g of the prepolymer (B) prepared in example 2 and 2.5 g of a silica formed by particles having a mean diameter by mass, Dm, of 9 microns, a pore volume of 1.2 ml/g and a specific surface (BET) of 400 m$^2$/g were next introduced into the reactor in a sequenced manner at the rate of 1 injection every 6 minutes, such silica being marketed under the trade name "SYLOBLOC 41" (Reg.) W. R. Grace (United States).

After about 3 hours following the start of the introduction of the prepolymer (B) and the silica, 55 ml/h of a molar solution of TEA in n-hexane was introduced into the reactor.

It was found that after stabilisation of the copolymerisation conditions about 85 kg/h was collected by sequenced withdrawal of a copolymer having a relatively high melt index, containing no agglomerates, and having the following characteristics:
density: 0.948
content by weight of units derived from 1-butene: 1.5%
melt index MI$_{2.16/190}$: 52 g/10 minutes
content by weight of titanium: 8 ppm
content by weight of silica: 0.03%
bulk density: 0.40 g/cm$^3$
mean diameter by mass of the copolymer particles: 800 microns
molecular weight distribution, Mw/Mn: 4.5.

EXAMPLE 5

Preparation of a Catalyst 40 g of a catalyst powder marketed under the trade name "EP 20" (Reg.) by Joseph Crosfield and Sons Ltd (Great Britain) were introduced into a fluidised-bed reactor 50 mm in diameter, this catalyst being formed by chromium oxide, of formula CrO$_3$, associated with a silica support and containing 1% by weight of chromium. The catalyst powder was subjected to nitrogen sweeping for 7 hours at 120° C. Then 40 millimoles of titanium tetraisopropylate were introduced into the reactor and nitrogen sweeping was continued for 2 hours at 120° C., then for 4 hours at 230° C. The catalyst was then activated by passing an ascending current of dry air through the fluidised-bed reactor for 5 hours at 550° C. The resulting catalyst (C) was cooled to ambient temperature (20° C.) and stored under nitrogen. It contained 0.9% by weight of chromium and 4.7% by weight of titanium.

Preparation of a Prepolymer 500 liters of n-hexane heated to 75° C., then 450 millimoles of TnOA and 10 kg of the previously prepared catalyst (C) were introduced under nitrogen into a stainless steel 1,000 liter reactor having an agitating system and a heating and cooling device. Then ethylene was introduced at a flow rate of 15 kg/h for 4 hours. Then the resulting prepolymer suspension was held at the temperature of 75° C. for 30 minutes, in order to consume as far as possible the ethylene which had not reacted. The reactor was then degassed and cooled to 60° C.

300 liters of n-hexane preheated to 60° C. was added to the prepolymer suspension, which was maintained under these conditions with agitation for 15 minutes before about 300 liters of the liquid phase were extracted from the suspension. The operation was repeated twice and then the prepolymer suspension was cooled to ambient temperature (20° C.) and 450 millimoles of TnOA were added. After drying under nitrogen, 60 kg of a prepolymer (D) was thus obtained which contained per gram $2.88 \times 10^{-2}$ milligram atoms of chromium.

Copolymerisation of Ethylene and 4-Methyl-1-pentene in a Fluidised Bed 70 kg of a powder of a copolymer of ethylene and 4-methyl-1-pentene powder identical with that to be produced and originating from a preceding reaction was introduced under nitrogen into a stainless steel fluidised bed reactor 45 cm in diameter and having a fluidisation grid at its base. The powder was subjected to nitrogen sweeping at 85° C. until a water content of 3 vpm was obtained in the reactor atmosphere. A gaseous mixture formed by hydrogen, ethylene and 4-methyl-1-pentene and nitrogen, driven at an ascending speed of 60 cm/second was then introduced into the reactor at the temperature of 85° C. The partial pressures (pp) of the constituents of the gaseous mixture were as follows:

pp hydrogen = 0.138 MPa
pp ethylene = 0.806 MPa
pp 4-methyl-1pentene: 0.056 MPA
pp nitrogen = 0.600 MPa.

0.7 liter of a molar solution of TEA in n-hexane was then introduced into the reactor, which was maintained in these conditions for 1 hour. Then 8 g of the prepolymer (D) and 1.22 g of a silica formed by particles having a mean diameter by mass, Dm, of 9 microns, a pore volumne of 1.2 ml/g and a specific surface (BET) of 400 M$^2$/g was introduced into the reactor in a sequenced manner at the rate of 1 injection every 15 minutes, such silica being marketed under the trade name "SYLOBLOC 41" (Reg.) by W. R. Grace (United States).

About 3 hours after the start of the introduction of the prepolymer (D) and the silica, 10 ml/h of a molar solution of TEA in n-hexane was introduced into the reactor.

It was found that after stabilisation of the copolymerisation conditions, about 24.5 kg/h of a copolymer powder was collected by sequenced withdrawal which contained no agglomerates and had the following characteristics:

density: 0.920
content by weight of units derived from 4-methyl-1-pentene: 9%
melt index (MI$_{2.16/190}$): 1.7 g/10 minutes
content by weight of chromium: 2 ppm
silica content 0.02% by weight
bulk density: 0.40 g/cm$^3$
mean diameter by mass of the copolymer particles: 1300 microns
molecular weight distribution, Mw/Mn: 6.7.

EXAMPLE 6

Preparation of a Catalyst 120 moles of titanium tetrachloride, 7.2 liters of n-hexane and 26.4 moles of diisoamyl ether were introduced at 25° C. into a stainless steel 60 liter reactor having an agitation system and a heating and cooling device. The mixture was then heated to 35° C. and a solution obtained at 25° C. by mixing 10.2 moles of diisoamyl ether and 15 moles of diethyl aluminium chloride (DEAC) dissolved in 10.8 liters of n-hexane was introduced into the reactor, slowly over 4 hours. The result was a solid catalyst (E) which was kept agitated for 1 hour at 35° C., then for 2 hours at 65° C. The solid catalyst was then washed 5 times by decantation with 30 liters of n-hexane at 65° C. It contained 28.8 gram-atoms of titanium.

Preparation of a Prepolymer 24 liters of a suspension in n-hexane of the solid catalyst (E) prepared as above, containing 6 gram-atoms of titanium, was introduced into a stainless steel 60 liter reactor having an agitation system and a heating and cooling device. 6 moles of DEAC were then introduced into the reactor and the reactor temperature fixed at 25° C. Then, gaseous propylene was introduced at a flow rate of 720 g/h for 5 hours. The introduction of the propylene was then stopped and the suspension of coated catalyst thus obtained was kept agitated at the same temperature for 1 hour. Then the agitation system was stopped and the coated catalyst decanted and the catalyst was washed 3 times by withdrawal of the supernatant liquid and the addition of 24 liters of n-hexane.

The result was a coated catalyst (F) which contained 0.01 millimole of aluminium trichloride, less than 0.001 millimole of diisoamyl ether and 0.6 g of polypropylene per milligram atom of titanium. It took the form of substantially spherical particles having a mean diameter by mass of 25 microns.

500 liters of n-hexane heated to 50° C., then 3.75 liters of a molar solution of DEAC in n-hexane and a quantity of the coated catalyst (F) previously prepared and containing 1.5 gram-atoms of titanium were introduced under nitrogen into a stainless steel 1,000 liter reactor having an agitating system and a heating and cooling device. A quantity of hydrogen corresponding to a partial pressure of 0.02 MPa was then introduced into the reactor, followed by propylene at a flow rate of 12.5 kg/h for 6 hours. The reactor was then degassed and cooled to ambient temperature (20° C.). The liquid phase was eliminated from the prepolymer suspension thus obtained: 4.5 moles of TEA was then added to the prepolymer, which was next dried under nitrogen. The result was a propylene prepolymer (G) in the form of a powder consisting of particles having a mean diameter by mass of 110 microns and containing 0.02 milligram atoms of titanium per gram.

Copolymerisation of Propylene and Ethylene in a Fluidised Bed 100 kg of a polypropylene powder subjected to nitrogen sweeping at 60° C. was introduced into a stainless steel fluidised bed reactor 45 cm in diameter and having a fluidisation grid at its base, until a water content of 3 vpm was obtained in the reactor atmosphere. Then a gaseous mixture formed by ethylene, propylene and nitrogen, driven at an ascending velocity of 35 cm/second was introduced into the reactor at a temperature of 5° C. The partial pressures pp of the constituents of the gaseous mixture were as follows:
  pp ethylene: 0.08 MPa
  pp propylene: 0.08 MPa
  pp nitrogen: 1.30 MPa.

0.7 liter of a molar solution of TEA in n-hexane was then introduced into the reactor, which was maintained under these conditions for 1 hour. Then 15 g of the prepolymer (G) previously prepared and 0.13 g of a silica consisting of particles having a mean diameter by mass, Dm of 2 microns, a pore volume of 1.6 ml/g and a specific surface (BET) of 400 m$^2$/g was introduced into the reactor in a sequenced manner at the rate of 1 injection every minute, such silica being marketed under the trade name "SYLOBLOC 44" (Reg.) by W. R. Grace (United States).

About 6 hours after the start of introduction of the prepolymer (G) and silica, 4 l/h of a molar solution of TEA in n-hexane was introduced into the reactor.

It was observed that after stabilisation of the copolymerisation conditions about 10 kg/h of a relatively amorphous copolymer powder was collected by sequenced withdrawal which contained no agglomerates and had the following characteristics:
  density: 0.858
  molar content of units derived from propylene: 48%
  molar content of units derived from ethylene: 52%
  content by weight of titanium: 86 ppm
  content by weight of silica: 0.08%
  bulk density: 0.33 g/cm$^3$
  mean diameter by mass of the copolymer particles: 300 microns
  intrinsic viscosity (at 135° C. in decalin): 12 dl/g
  melting enthalpy (DSC): lower than 15 J/g
  crystallinity of the polypropylene type (determined by X-ray diffraction): 7%
  crystallinity of the polyethylene type (determined by X-ray diffraction): lower than 1%.

EXAMPLE 7

Preparation of a Prepolymer 500 liters of n-hexane heated to 50° C., then 7.5 liters of a molar solution of DEAC in n-hexane and a quantity of the coated catalyst (F), prepared in example 6 and containing 1.5 gram atoms of titanium was introduced under nitrogen into a stainless steel 1,000 liter reactor having an agitating system and a heating and cooling device. A quantity of hydrogen corresponding to a partial pressure of 0.02 MPa, then propylene at a flow rate of 12.5 kg/h was introduced into the reactor over 6 hours. The reactor was then degassed and cooled to ambient temperature at 20° C. The liquid phase was eliminated from the resulting prepolymer suspension, 7.5 moles of DEAC were added and the prepolymer was dried under nitrogen. The result was a propylene-based prepolymer (H) in the form of a powder formed by particles having a mean diameter by mass of 110 microns and containing per gramme 0.02 milligram atoms of titanium.

Copolymerisation of Propylene and 1-Butene in a Fluidised Bed 100 kg of a propylene and 1-butene copolymer powder identical with that to be produced and originating from a preceding reaction was introduced under nitrogen into a stainless steel fluidised bed reactor 45 cm in diameter and having a fluidisation grid at its base. The powder was subjected to nitrogen sweeping at 60° C., until a water content of 3 vpm was obtained in the reactor atmosphere. The gaseous mixture formed by hydrogen, propylene, 1-butene and nitrogen, driven at an ascending speed of 35 cm/second was then introduced into the reactor at the temperature of 60° C. The partial pressures (pp) of the constituents of the gaseous mixture was as follows:
  pp hydrogen: 0.01 MPa
  pp propylene: 0.44 MPa
  pp 1-butene: 0.15 MPa
  pp nitrogen: 1.30 MPa.

0.7 liter of a molar solution of DEAC in n-hexane was then introduced into the reactor, which was kept in these conditions for 1 hour. Then 15 g of the prepolymer (H) and 0.36 g of a silica formed by particles having a mean diameter by mass Dm of 2 microns, a pore volume of 1.6 ml/g and a specific surface (BET) of 400 m$^2$/g was introduced into the reactor in a sequenced manner, at the rate of 1 injection every 30 seconds, this silica being marketed under the trade name "SYLOBLOC 44" (Reg.) by W. R. Grace (United States).

It was found that after stabilisation of the copolymerisation conditions about 18 kg of a relatively amorphous copolymer powder was recovered by sequenced withdrawal which contained no agglomerates and had the following characteristics:
  content by weight of units derived from 1-butene: 20%
  melt index MI$_{5/190}$: 10 g/10 minutes
  content by weight of titanium: 95 ppm
  content by weight of silica: 0.06%
  mean diameter by mass of the copolymer particles: 290 microns
  melting enthalpy (DSC): 55 J/g.

EXAMPLE 8

Preparation of a Catalyst 120 moles of titanium tetrachloride, 7.2 liters of n-hexane and 26.4 moles of diisoamylether were introduced at 25° C. into a stainless steel 60 liter reactor having an agitating system and a heating and cooling device. The mixture was then heated to 35° C. and a solution, obtained at 25° C. by mixing 10.2 moles of diisoamylether and 15 moles of diethyl aluminium chloride (DEAC) dissolved in 10.8 liters of n-hexane was introduced into the reactor slowly for 4 hours. A solid catalyst (J) was obtained which was kept agitated for 1 hour at 35° C. and then for 2 hours at 65° C. The solid catalyst (J) was then washed 5 times by decantation with 30 liters of n-hexane at 65° C. It contained 28.8 gramme-atoms of titanium.

Preparation of a Composition Comprising a Prepolymer 24 liters of a suspension in n-hexane of the solid catalyst (J) previously prepared, containing 6 gramma-atom of titanium, was introduced into a stainless steel 60 liter reactor having an agitating system and a heating and cooling device. Six moles of DEAC were then introduced into the reactor and the reactor temperature was fixed at 25° C. Then gaseous propylene was introduced at a flow rate of 720 g/h for 5 hours. The introduction of the propylene was then stopped and the coated catalyst suspension thus obtained was kept agitated at the same temperature for 1 hour. Then the agitating system was stopped, the coated catalyst was decanted and washed three times by withdrawal of the supernatant liquid, and the 24 liters of n-hexane were added.

The coated catalyst (K) which contains per milligram atom of titanium 0.01 millimole of aluminium trichloride, less than 0.001 millimole of diisoamyl ether and 0.6 g of polyproylene. It takes the form of substantially spherical particles having a mean diameter by mass of 25 microns.

By way of charge powder 5 kg of powder of a copolymer of propylene, ethylene and 4-methyl-1-pentene identical with that to be subsequently produced in the fluidised bed, and then a quantity of the coated catalyst (K) previously prepared, containing 100 milligram atoms of titanium, 300 millimoles of triethyl aluminium (TEA) and 54 g of a silica formed by particles having a mean diameter by mass, DM, of 2 microns, a pore volume of 1.6 ml/g and a specific surface BET of 400 m²/g, such silica being marketed under the trade name SYLOBLOC 44 (Reg.) by W. R. Grace (United States) were introduced into a stainless steel 90 liter reactor having an agitating system and a heating and cooling device. The mixture was agitated for 1 hour at 5° C. Then an equimolar mixture of propylene and ethylene at a flow rate of 625 g/h was introduced into the reactor at that temperature for 8 hours. The result was a composition (L) comprising in addition to the charge powder formed by the copolymer of propylene, ethylene and 4-methyl-1-pentene, (a) a powder of a propylene and ethylene prepolymer comprising per gramme $2 \times 10^{-2}$ milligramme atoms of titanium and containing 3 millimoles of TEA per milligramme atom of titanium and (b) 1.1% by weight of silica in relation to the prepolymer. The propylene and ethylene prepolymer was formed by solid particles having a mean diameter by mass of about 110 microns.

Copolymerisation of Propylene, Ethylene and 4-Methyl-1-pentene in a Fluidised Bed 100 kg of a powder of a copolymer of propylene, ethylene, and 4-methyl-1-pentene copolymer identical with that to be produced, originating from an earlier reaction, therefore containing silica, the mixture being subjected to a nitrogen sweep at 85° C. until a water content of 3 vpm was obtained in the reactor atmosphere, were introduced under nitrogen into a stainless steel fluidised bed reactor 45 cm in diameter and having a fluidisation grid at its base. A gaseous mixture formed by ethylene, propylene and nitrogen, driven at an ascending speed of 35 cm/second at a temperature of 5° C. was the introduced into the reactor. The partial pressures (pp) of the constituents of the gaseous mixture were as follows:

pp ethylene: 0.08 MPa
pp propylene: 0.08 MPa
pp nitrogen: 1.30 MPa.

0.7 liter of a molar solution of TEA in n-hexane was then introduced into the reactor, which was maintained in these conditions for 1 hour. Then 15 g of the previously prepared composition (L) was introduced into the reactor in a sequenced manner, at the rate of one injection every 32 seconds.

Six hours after the start of introduction of composition (L), 120 g/h of 4-methyl-1-pentene and 4.2 l/h of a molar solution of TEA in n-hexane were regularly introduced into the reactor.

It was found that after stabilisation of the copolymerisation conditions, about 10 kg/h of an amorphous copolymer powder was collected by sequenced withdrawal, which contained no agglomerates and had the following characteristics:

density: 0.855
molar content of units derived from propylene: 47%
molar content of units derived from ethylene: 52%
molar content of units derived from 4-methyl-1-pentene: 1%
content by weight of titanium: 80 ppm
content by weight of silica: 0.09%
bulk density: 0.30 g/cm³
mean diameter by mass of the copolymer particles: 310 microns
intrinsic viscosity(at 135° C. in decalin): 12 dl/g
fusion enthalpy (DSC): lower than 3 J/g
crystallinity of polypropylene type (determined by X-ray diffraction): 0%
crystallinity of polyethylene type (determined by X-ray diffraction): less than 1%.

EXAMPLE 9

Preparation of a Composition Comprising a Prepolymer

By way of charge powder 1.5 kg of a powder of propylene and 1-butene charge identical with that to be subsequently produced in the fluidised bed, and then a quantity of the coated catalyst K prepared in Example 8, containing 100 milligram atoms of titanium, 500 millimoles of diethyl aluminium chloride (DEAC) and 30 g of SYLOBLOC 44 (Reg.) silica was introduced into a stainless 90 liter reactor having an agitating system and a heating and cooling device. The reactor was heated to 60° C. and the mixture agitated for 1 hour. Then a mixture of propylene and 1-butene in a molar ratio of 75/25, at a flowrate of 625 g/h was introduced into the reactor for 8 hours. Then the reactor was cooled to ambient temperature (20° C.) and degassed. Next 500 millimoles of DEAC was added with agitation to the mixture obtained. Agitation was continued in these conditions for 1 hour. The result was a composition (M) comprising, in addition to the charge powder, (a) a powder of a propylene and 1-butene prepolymer comprising per gramme $2 \times 10^{-2}$ milligramme atoms of titanium and containing 5 millimoles of TEAC per milligramme atom of titanium and (b) 0.6% by weight of silica in relation to the prepolymer.

The prepolymer was formed by solid particles having a mean diameter by mass of about 110 microns.

Copolymerisation of Propylene and 1-Butene in a Fluidised Bed 100 kg of a powder of propylene and 1-butene copolymer identical with that to be produced and originating from an earlier reaction and therefore containing silica, the mixture obtained being subjected to a nitrogen sweep at a 60° C. until a water content of 3 vpm was obtained in the reactor atmosphere, were introduced under nitrogen into a stainless fluidised bed reactor 45 cm in diameter and having a fluidisation grid at its base. Then a gaseous mixture formed by hydrogen, propylene, 1-butene and nitrogen, driven at an ascending speed of 35 cm/second at a temperature of 60° C. was introduced into the reactor. The partial pressures (pp) of the constituents of the gaseous mixture were as follows:

pp hydrogen: 0.01 MPa
pp propylene: 0.44 MPa
pp 1-butene: 0.15 MPa
pp nitrogen: 1.30 MPa.

Then 0.7 liter of a molar solution of DEAC in n-hexane was introduced into the reactor, which was maintained in these conditions for 1 hour. Then 19.5 of the previously prepared composition (M) was introduced into the reactor in a sequenced manner at the rate of one injection every 30 seconds.

It was found that after stabilisation of the copolymerisation conditions, about 18 kg of a powder of a relatively amorphous copolymer was collected by sequenced withdrawal, which contained no agglomerates and had the following characteristics:

content by weight of units derived from 1-butene: 23%
melt index, $MI_{5/190}$: 10 g/10 minutes
content by weight of titanium: 96 ppm
content by weight of silica: 0.06%
mean diameter by mass of the copolymer particles: 300 microns
fusion enthalpy (DSC): 42 Jg.

EXAMPLE 10

Preparation of a Catalyst 40 liters of n-hexane, 50 g of iodine and 700 g of a metallic magnesium powder formed by particles having a mean diameter by mass, Dm, of 60 microns were successively introduced under nitrogen at ambient temperature (20° C.) into a stainless steel 60 liter reactor having an agitating system and a heating and cooling device. The mixture was kept agitated in these conditions for 3 hours. The reactor was heated to 80° C. and 3.36 moles of titanium tetra-n-propylate and 3.36 moles of titanium tetrachloride were successively introduced, followed by 40.6 moles of n-butylchloride, slowly over 4 hours. Then the mixture was kept agitated for 3 hours, whereafter it was cooled to ambient temperature (20° C.). The solid catalyst (N) thus obtained was washed 3 times, with intermediate decantation, with 20 liters of n-hexane. It contained 8% by weight of titanium.

Preparation of a Composition Comprising a Prepolymer 500 liters of n-hexane heated to 75° C., then 1.5 liters of a molar solution of tri-n-octylaluminium (TnOA) in n-hexane, a quantity of the previously prepared catalyst (N), containing 1.5 gramme-atoms of titanium and 1350 g of a silica formed by particles having a mean diameter by mass (Dm) of 5 microns, a pore volume of 1.2 mm/g and a specific surface (BET) of 400 m²/g, such silica being marketed under the trade name "SYLOBLOC 47" (Reg.) by W. R. Grace (United States) were introduced under nitrogen into a stainless steel 1000 liter reactor having an agitating system and heating and cooling device. Then a quantity of hydrogen corresponding to a partial pressure of 0.1 MPa was introduced into the reactor, followed by ethylene at a flow rate of 15 kg/h for 4 hours. The reactor was then degassed and cooled to ambient temperature (20° C.). After drying under nitrogen, a composition (P) was obtained which comprised:

(a) a powder of an ethylene prepolymer comprising per gramme $2.5 \times 10^{-2}$ milligramme atoms of titanium and containing 1 millimole of TnOA per milligramme atom of titanium and,
(b) 2.25% by weight of silica in relation to the prepolymer. The prepolymer powder contained in the composition (P) was formed by particles having a mean diameter by mass, Dm, of 120 microns.

Polymerisation of Ethylene in a Fluidised Bed 70 kg of powder of ethylene polymer similar to that to be produced, originating from the previous reaction and therefore containing silica, the mixture thus obtained being subjected to a nitrogen sweep at a 92° C. until a water content of 3 vmp was obtained in the reactor atmosphere, was introduced under nitrogen into a stainless steel fluidised bed reactor 45 cm in diameter and having a fluidisation grid at its base. Then a gaseous mixture formed by hydrogen, ethylene and nitrogen, driven at an ascending speed of 50 cm/second at a temperature of 92° C. was introduced into the reactor. The partial pressures (pp) of the constituents of the gaseous mixture were as follows:

pp hydrogen: 0.40 MPa
pp ethylene: 0.32 MPa
pp nitrogen: 0.88 MPa.

Then 0.7 liter of a molar solution of TEA in n-hexane was introduced into the reactor, which was maintained in these conditions for 1 hour. Then 15 g of the previously prepared composition (P) was introduced into the reactor in a sequenced manner at the rate of one injection every 200 seconds.

After about 3 hours following the start of the introduction of the composition (P), 13 ml/h of a molar solution of TEA in n-hexane was introduced into the reactor.

It was found that after stabilisation of the polymerisation conditions, about 20 kg/h of a polymer powder was obtained by sequenced withdrawal which had a relatively high melt index, contained no agglomerates, and had the following characteristics:

density: 0.956 melt index $MI_{2.16/190}$: 210 g/10 minutes
content by weight of titanium: 16 ppm
content by weight of silica: 0.03%
bulk density: 0.43 g/cm$^3$
mean diameter by mass of the copolymer particles: 700 microns
molecular weight distribution, Mw/Mn: 4.2.

EXAMPLE 11

Preparation of a Composition Comprising a Prepolymer

Operations were performed exactly as in Example 3, except that 2400 g of "SYLOBLOC 47" (Reg.) of silica were used instead of 1350 g. The result was a composition (Q) which comprised:

(a) a powder of an ethylene prepolymer comprising per gramme $2.5 \times 10^{-2}$ milligramme-atoms of titanium and containing 1 millimole of TnOA per milligramme-atom of titanium, and (b) 4% by weight of silica with relation to the prepolymer.

The prepolymer powder contained in composition Q was formed by particles having a mean diameter by mass, Dm, of 180 microns.

Copolymerisation of Ethylene and 1-Butene in a Fluidised Bed 70 kg of an ethylene and 1-butene copolymer powder identical with that to be produced and containing 28 g of "TIXOSOL A 38" (Reg.) silica, the resulting mixture being subjected to a nitrogen sweep at 65° C., until a water content of 3 vpm was obtained in the reactor atmosphere, was introduced under nitrogen into a stainless steel fluidised bed reactor 45 cm in diameter and having a fluidisation grid in its base. Then a gaseous mixture formed by hydrogen, ethylene, 1-butene and nitrogen, driven at an ascending speed of 50 cm/second at a temperature of 65° C. was introduced into the reactor. The partial pressures (pp) of the constituents of the gaseous mixture were as follows:

pp hydrogen: 0.10 MPa
pp ethylene: 0.53 MPa
pp 1-butene: 0.37 MPa
pp nitrogen: 1.00 MPa.

0.7 liter of a molar solution of triethyl aluminium (TEA) in n-hexane was then introduced into the reactor, which was maintained in these conditions for 1 hour. Then 15 g of the previously prepared composition (Q) was introduced into the reactor in a sequenced manner, at the rate of one injection every 260 seconds.

About 3 hours after the start of the introduction of the composition (Q), 10 ml/h of a molar solution of TEA in n-hexane was introduced into the reactor.

It was found that after stabilisation of the copolymerisation conditions, about 20 mg/h of a copolymer powder of relatively low density and high melt index was collected by sequenced withdrawal, which contained no agglomerates and had the following characteristics:

density: 0.881
content by weight of units derived from 1-butene: 19.6%
melt index $MI_{2.16/190}$: 10.4 g/10 minutes
content by weight of titanium: 12 ppm
content by weight of silica: 0.04%
bulk density: 0.30 g/cm$^3$
mean diameter by mass of the copolymer particles: 800 microns
molecular weight distribution, Mw/Mn: 4.6.

EXAMPLE 12

Preparation of a Catalyst 40 g of catalyst powder marketed under the trade name "EP 20" (Reg.) by Joseph Crosfield and Sons Ltd (Great Britain), such catalyst being formed by chromium oxide, of formula $CrO_3$, associated with a silica support and containing 1% by weight of chromium were introduced into a fluidised bed reactor 50 mm in diameter. The catalyst powder was subjected to a nitrogen sweep for 7 hours at 120° C. Then 40 millimoles of titanium tetraisopropylate were introduced into the reactor and the nitrogen sweep was continued for 2 hours at 120° C., then for 4 hours at 230° C. The catalyst was then activated by passing an ascending current of dry air through the fluidised bed reactor for 5 hours at a 550° C. The resulting catalyst (R) was cooled to ambient temperature (20° C.) and preserved under nitrogen. It contained 0.9% by weight of chromium and 4.7% by weight of titanium.

Preparation of a Composition Comprising a Prepolymer 500 liters of n-hexane heated to 75° C., then 250 millimoles of TnOA, 5.78 kg of the previously prepared catalyst (R) and 2470 g of a silica formed by particles having a mean diameter by mass, Dm, of 9 microns, a pore volume of 1.2 mm/g and a specific surface (BET) of 400 m$^2$/g, such silica being marketed under the trade name "SYLOBLOC 41" (Reg.) by W. R. Grace (United States), was introduced under a nitrogen atmosphere into a stainless 1000 liter reactor having an agitating system and a heating and cooling device.

Ethylene was then introduced at a flow rate of 15 kg/h for 4 hours. Then the reactor was degassed and cooled to 60° C.

300 liters of n-hexane preheated to 60° C. were added to the mixture of silica and prepolymer, which were kept in these conditions with agitation for 15 minutes, before about 300 liters of the liquid phase was extracted from the suspension. The operation was repeated twice, then the mixture was cooled to ambient temperature 20° C., and 620 millimoles of TnOA were added. After drying under nitrogen, 60 kg were thus obtained of a composition (S) comprising:

(a) a powder of an ethylene prepolymer comprising per gramme $1.67 \times 10^{-2}$ milligramme-atoms of chromium and containing 0.87 millimoles of TNOA per milligramme atom of chromium, and (b) 4.1% by weight of silica in relation to the prepolymer.

The prepolymer powder contained in the composition (S) was formed by particles having a mean diameter by mass, Dm, of 260 microns.

Copolymerisation of Ethylene and 1-Butene in a Fluidised Bed 70 kg of a powder of ethylene and 1-butene copolymer identical with that to be produced containing 7 g of "SYLOBLOC 41" (Reg.) silica were introduced under nitrogen into a stainless steel fluidised bed reactor 45 cm in diameter having a fluidisation grid at its base, the resulting mixture being subjected to a nitrogen sweep at 92° C. until a water content of 3 ppm was obtained in the reactor atmosphere. Then a gaseous mixture formed by hydrogen, ethylene, 1-butene and nitrogen, driven at an ascending speed of 60 cm/second was introduced into the reactor at the temperature of 92° C. The partial pressures (pp) of the constituents of the gaseous mixture were as follows:

pp hydrogen: 0.52 MPa
pp ethylene: 0.80 MPa
pp 1-butene: 0.04 MPa
pp nitrogen: 0.24 MPa.

Then 0.7 liter of a molar solution of TEA in n-hexane was introduced into the reactor, which was maintained in these conditions for 1 hour. Then 10 g of the previously prepared composition (S) was introduced into the reactor in a sequenced manner at the rate of one injection every 13 minutes.

About 3 hours after the start of the introduction of the composition (S), 10 ml/h of a molar solution of TEA in n-hexane were introduced into the reactor.

It was found that after stabilisation of the copolymerisation conditions, about 18 kg/h of a copolymer powder were collected by sequenced withdrawal, which contained no agglomerates and had the following characteristics:

density: 0.918
content by weight of units derived from 1-butene: 7.3%
melt index ($MI_{2.16/190}$): 0.52 g/10 minutes
content by weight of chromium: 2 ppm
silica content: 0.01% by weight
bulk density: 0.38 g/cm$^3$
mean diameter by mass of the copolymer particles: 1200 microns
molecular weight distribution, Mw/Mn: 6.5.

We claim:

1. A solid composition containing catalytically active sites for a gas phase (co) polymerisation of alpha-olefins and optionally dienes, characterised in that it comprises:
   (a) 100 parts by weight of a powder of a prepolymer of one or more alpha-olefins and optionally dienes, the said powder consisting of particles having a mean diameter by mass of from 50 to 500 microns, and containing per gram from $10^{-3}$ to $10^{-1}$ milligram atoms of a transition metal belonging to Groups IV, V or VI of the Periodic Table of Elements and from 0 to 20 millimols of at least one organometallic compound of a metal belonging to Groups I to III of the Periodic Table of Elements per milligram atom of the said transition metal, and
   (b) from 0.1 to 20 parts by weight of a pulverulent inorganic substance consisting of particles chemically inert to the constituents used in the said gas phase (co-)polymerisation and being free from transition metal compound, said particles having a mean diameter by mass from 10 to 200 times lower than the mean diameter by mass of the particles of the said powder of prepolymer.

2. A solid composition according to claim 1, characterised in that it comprises from 25 to 500 parts by weight of a solid pulverulent diluent based on a polyolefin, substantially chemically inert to the constituents used in the said gas phase (co-)polymerisation and consisting of particles having a mean diameter by mass of from 200 and 2,000 microns.

* * * * *

UNITED STATES PATENT AND TRADEMARK OFFICE
CERTIFICATE OF CORRECTION

PATENT NO. : 5,063,110
DATED : November 5, 1991
INVENTOR(S) : Jean-Claude A. Bailly and Joelle Collomb It is certified that error appears in the above-identified patent and that said Letters Patent is hereby corrected as shown below:

Column 19, line 23, "gramma" should read --gramme--.

Signed and Sealed this

Twentieth Day of April, 1993

Attest:

MICHAEL K. KIRK

Attesting Officer

Acting Commissioner of Patents and Trademarks